(12) United States Patent
Takahashi et al.

(10) Patent No.: US 11,248,651 B2
(45) Date of Patent: Feb. 15, 2022

(54) MOTION GUIDE APPARATUS

(71) Applicant: THK CO., LTD., Tokyo (JP)

(72) Inventors: Toru Takahashi, Tokyo (JP); Ryuichi Yamakoshi, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/500,621

(22) PCT Filed: Mar. 14, 2018

(86) PCT No.: PCT/JP2018/009859
§ 371 (c)(1),
(2) Date: Oct. 3, 2019

(87) PCT Pub. No.: WO2018/186133
PCT Pub. Date: Oct. 11, 2018

(65) Prior Publication Data
US 2020/0386270 A1  Dec. 10, 2020

(30) Foreign Application Priority Data

Apr. 7, 2017  (JP) .............................. JP2017-076500

(51) Int. Cl.
*F16C 29/06* (2006.01)
*F16C 33/37* (2006.01)
*F16C 33/38* (2006.01)

(52) U.S. Cl.
CPC ........ *F16C 29/0609* (2013.01); *F16C 29/064* (2013.01); *F16C 29/0647* (2013.01); *F16C 33/3706* (2013.01); *F16C 33/3837* (2013.01)

(58) Field of Classification Search
CPC .. F16C 29/06; F16C 29/0602; F16C 29/0607; F16C 29/0609; F16C 29/0611;
(Continued)

(56) References Cited

U.S. PATENT DOCUMENTS 4,595,244 A * 6/1986 Teramachi .......... F16C 29/0607
384/15
4,655,611 A     4/1987 Kondo
(Continued)

FOREIGN PATENT DOCUMENTS

CN   104271972 A   1/2015
CN   105275988 A   1/2016
(Continued)

OTHER PUBLICATIONS

Translation of WO2009/028328 (equivalent JP5386356) obtained Nov. 4, 2020.*
(Continued)

*Primary Examiner* — James Pilkington
(74) *Attorney, Agent, or Firm* — Westerman, Hattori, Daniels & Adrian, LLP

(57) ABSTRACT

A motion guide apparatus is provided which can make a carriage compact without reducing a rated load and an allowable load. The motion guide apparatus includes: a track member (1) and a carriage (2) that moves along the track member (1). A circulation path (7) of the carriage (2) includes a loaded path (C1), a return path (C2) parallel to the loaded path (C1), and a substantially U-shaped turn path (C3) connected to the loaded path (C1) and the return path (C2). At least a part of the turn path (C3) bends in side view in a direction where the loaded path (C1) and the return path (C2) coincide.

4 Claims, 11 Drawing Sheets

(58) Field of Classification Search
CPC .................. F16C 29/0633; F16C 29/0638;
F16C 29/064; F16C 29/0642; F16C
29/0645; F16C 29/0647; F16C 29/0652;
F16C 29/0654; F16C 29/0657; F16C
29/0659; F16C 29/0661; F16C 33/3706;
F16C 33/3837
See application file for complete search history.

(56) References Cited

U.S. PATENT DOCUMENTS

| 5,002,403 | A | | 3/1991 | Hirose et al. | |
|---|---|---|---|---|---|
| 5,993,064 | A | * | 11/1999 | Teramachi | F16C 29/0642 384/43 |
| 8,926,181 | B2 | * | 1/2015 | Hsu | F16C 29/0609 384/44 |
| 2015/0093055 | A1 | | 4/2015 | Ikegami et al. | |
| 2015/0345560 | A1 | | 12/2015 | Roesch et al. | |

FOREIGN PATENT DOCUMENTS

| JP | 61-97626 U | | 6/1986 |
|---|---|---|---|
| JP | 61-157826 A | | 7/1986 |
| JP | 63-38716 A | | 2/1988 |
| JP | 10-184681 A | | 7/1998 |
| JP | 2003-343556 A | | 12/2003 |
| JP | 2010-249229 A | | 11/2010 |
| WO | WO2009/028328 | * | 3/2009 |

OTHER PUBLICATIONS

International Search Report dated Jun. 12, 2018, issued in counterpart International Application No. PCT/JP2018/009859 (2 pages).
Notification of Reasons for Refusal dated Mar. 5, 2019, issued in counterpart of Japanese Patent Application No. 2017-076500, with English Translation (9 pages).
Office Action dated Feb. 28, 2020, issued in counterpart CN Application No. 201880023828.5, with English Translation. (9 pages).

\* cited by examiner

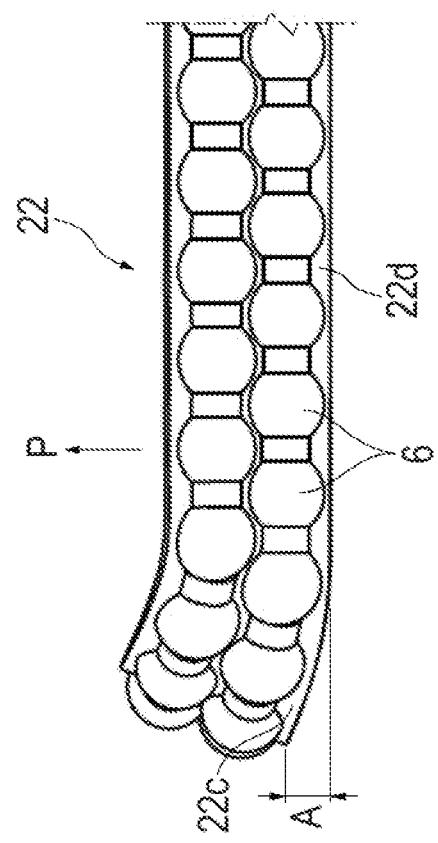
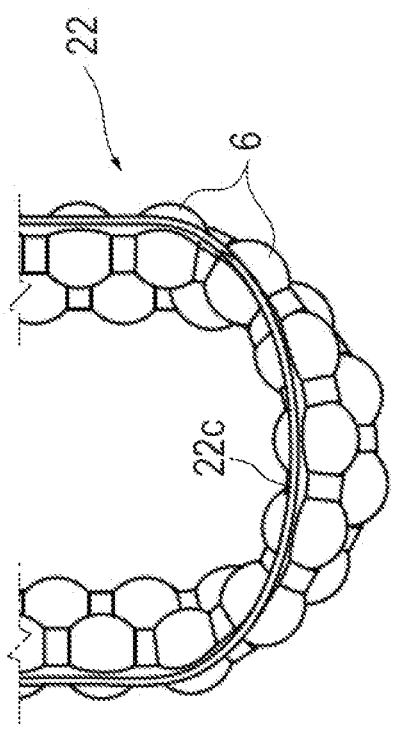
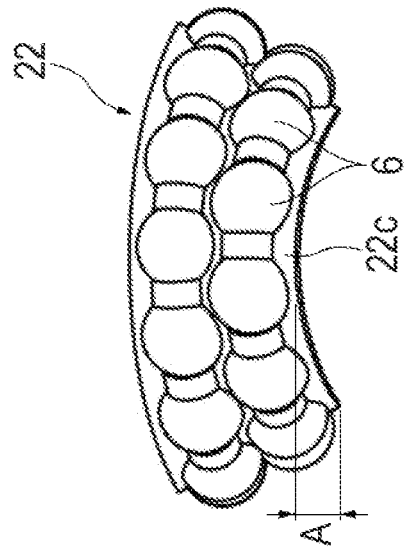

MOTION GUIDE APPARATUS

CROSS-REFERENCE TO RELATED APPLICATIONS

The description is based on JP 2017-076500 A filed on Apr. 7, 2017, the entire contents of which are incorporated herein.

TECHNICAL FIELD

The present invention relates to a motion guide apparatus that guides the motion of a table or the like.

BACKGROUND ART

This type of motion guide apparatus includes a track member assembled to a base or the like, a carriage that is assembled to the track member in such a manner as to be relatively movable via rolling elements such as balls or rollers, and is mounted on a table or the like. A rolling element rolling portion where the rolling elements roll is formed on the track member. A loaded rolling element rolling portion facing the rolling element rolling portion is formed on the carriage. When the carriage moves relative to the track member, the rolling elements perform rolling motion in a loaded path between the rolling element rolling portion and the loaded rolling element rolling portion.

The carriage is provided with a circulation path for circulating the rolling elements. The circulation path includes the loaded path, a return path parallel to the loaded path, and a substantially U-shaped turn path connected to the loaded rolling element rolling portion and the return path. The circulation path has a track shape. When the carriage moves relative to the track member, the rolling elements circulate in the circulation path.

In a known motion guide apparatus, the circulation path is placed on a plane. The circulation path is placed in a direction of a contact angle of the rolling element as viewed from the front of the carriage (as viewed in a direction of the relative movement of the carriage) (refer to Patent Literature 1). This is for the purpose of ensuring a contact width between the rolling element and the rolling element rolling portion and a contact width between the rolling element and the loaded rolling element rolling portion.

CITATION LIST

Patent Literature

Patent Literature 1: JP 2003-343556 A

SUMMARY OF INVENTION

Technical Problem

However, the known motion guide apparatus has a problem that the size of the carriage is increased due to the above constraints on the layout of the circulation path. There is a problem that if the circulation path is shifted from the direction of the contact angle of the rolling element as viewed from the front of the carriage to make the carriage compact, the contact width of the rolling element is sacrificed and the rated load and allowable load of the motion guide apparatus are reduced.

Hence, an object of the present invention is to provide a motion guide apparatus that can prevent reductions in rated load and allowable load and make a carriage compact.

Solution to Problem

In order to solve the above problems, an aspect of the present invention is a motion guide apparatus including: a track member having a rolling element rolling portion; a carriage having a loaded rolling element rolling portion facing the rolling element rolling portion, a return path parallel to the loaded rolling element rolling portion, and a substantially U-shaped turn path connected to the loaded rolling element rolling portion and the return path; and a plurality of rolling elements arranged in a loaded path between the rolling element rolling portion and the loaded rolling element rolling portion, the return path, and the turn path in such a manner as to be capable of circulating, in which at least a part of the turn path bends in side view in a direction where the loaded path and the return path coincide.

Advantageous Effects of Invention

According to the present invention, the degree of freedom in placement design of the circulation path can be increased without sacrificing the contact width of the rolling element. Hence, it is possible to prevent reductions in rated load and allowable load and make the carriage compact.

BRIEF DESCRIPTION OF DRAWINGS

FIGS. 8A-8C are third angle projection (FIG. 8A is a plan view, FIG. 8B is a front view, and FIG. 8C is a side view) of the retainer band spaced apart in an inverted V-shape.

DESCRIPTION OF EMBODIMENTS

Embodiments of a motion guide apparatus of the present invention are described hereinafter on the basis of the accompanying drawings. However, the motion guide apparatus of the present invention can be embodied in various forms, and is not limited to the embodiments described in the description. The embodiments are provided with the intention of enabling those skilled in the art to fully understand the scope of the invention by fully disclosing the description.

First Embodiment

Figure 1:
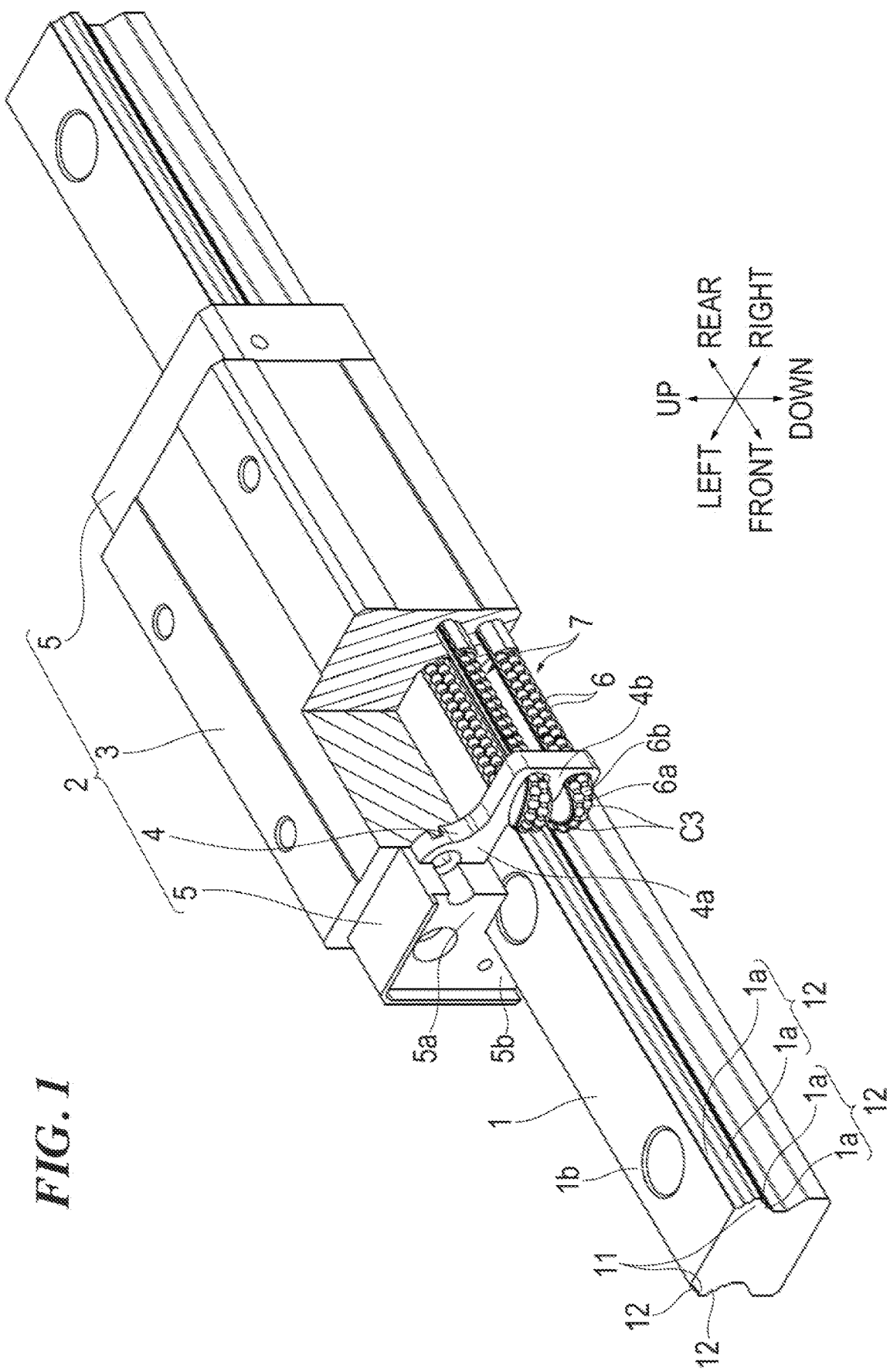
FIG. 1 is a perspective view (including a partial cross-section) of a motion guide apparatus of a first embodiment of the present invention.
Figure 2:
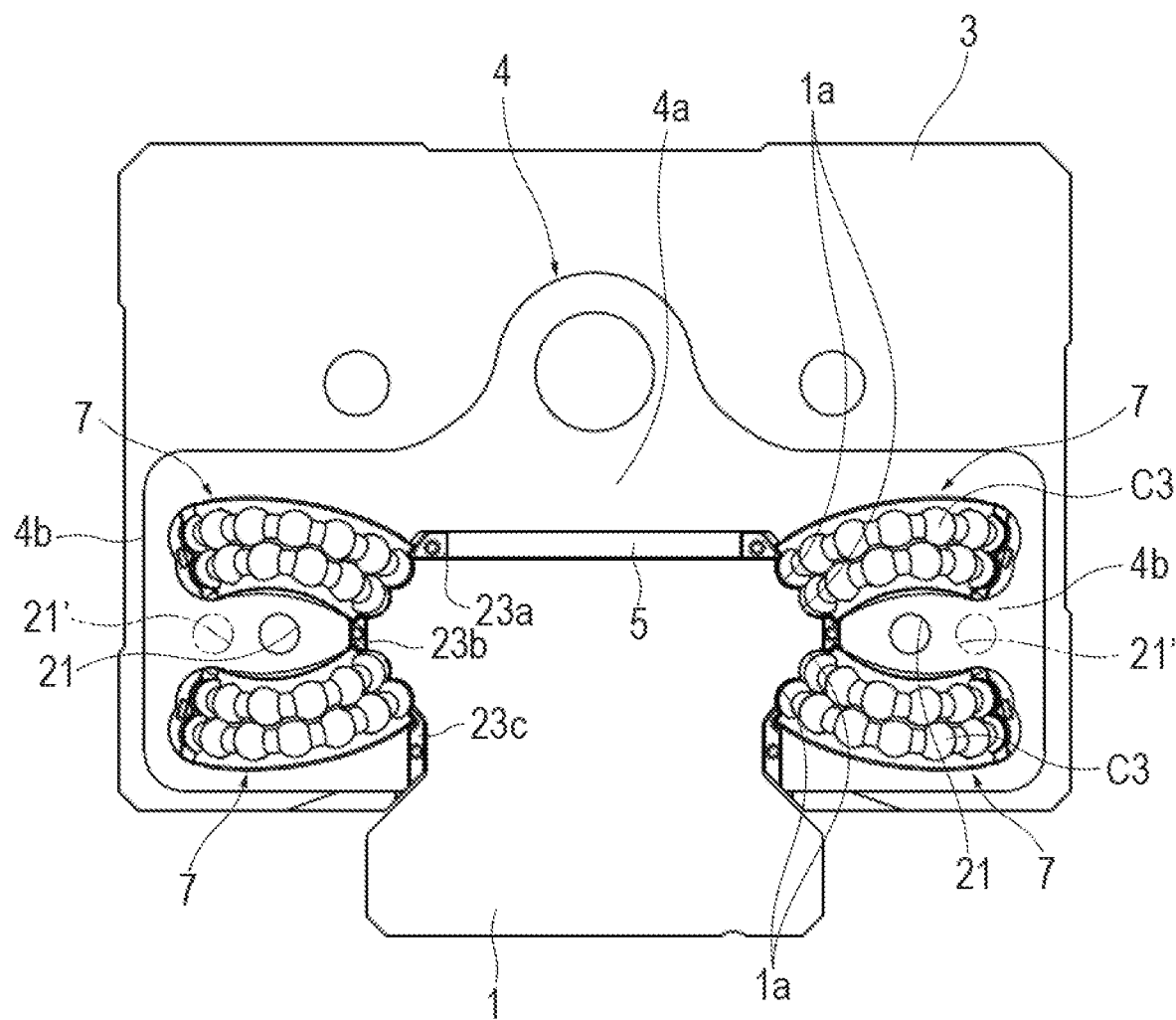
FIG. 2 is a front view of the motion guide apparatus of the embodiment in a state where an end plate has been removed.
Figure 3:
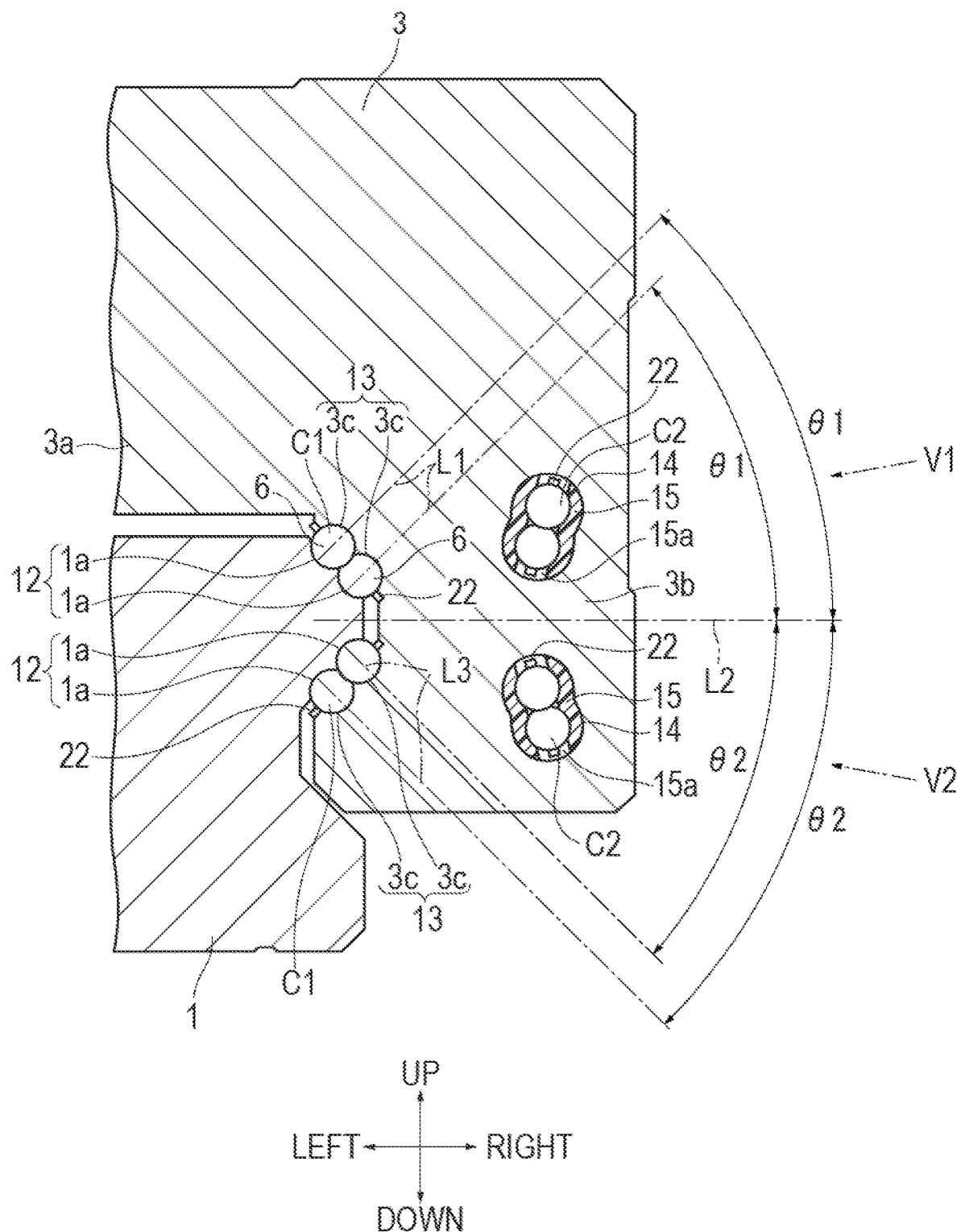
FIG. 3 is a cross-sectional view of the motion guide apparatus of the embodiment orthogonal to a direction of the relative movement of a carriage.

FIGS. 1 to 3 illustrate a motion guide apparatus of a first embodiment of the present invention. FIG. 1 is a perspective view (including a partial cross-section) of the motion guide apparatus. FIG. 2 is a front view of the motion guide apparatus in a state where an end plate 5 has been removed (as viewed in a direction of the relative movement of a carriage 2). FIG. 3 is a cross-sectional view of the motion guide apparatus orthogonal to the direction of the relative movement of the carriage 2.

In the following description, for convenience of description, the configuration of the motion guide apparatus is described, using directions as the motion guide apparatus is viewed from the front (viewed in the direction of the relative movement of the carriage 2) when the motion guide apparatus is placed on a horizontal plane, that is, up and down, left and right, and front and rear in FIGS. 1 and 2. Naturally, the placement of the motion guide apparatus is not limited to this.

As illustrated in FIG. 1, the motion guide apparatus of the first embodiment is a linear guide. A reference sign 1 denotes a guide rail as a track member, the reference sign 2 denotes the carriage, and a reference sign 6 denotes a ball as a rolling element. Two upper and lower track-shaped circulation paths 7 are provided on each of the left and right sides of the carriage 2. The number of the circulation paths 7 is four in total. In the first embodiment, eight ball rows 6a and 6b in total are provided in the circulation paths 7, two ball rows 6a and 6b in each circulation path 7, to achieve low waving and high rigidity.

The guide rail 1 is long in the front and rear direction. A ridge 11 protruding in the left and right direction is formed on each of the left and right sides of an upper part of the guide rail 1. Two upper and lower ball rolling portions 12 as rolling element rolling portions are formed on each of the left and right sides of the guide rail 1 in such a manner as to sandwich the ridge 11. Two ball rolling grooves 1a are formed on each ball rolling portion 12. Eight ball rolling grooves 1a in total are formed on the guide rail 1. The ball rolling groove 1a is a circular arc groove with a single arc cross-section. A through-hole 1b for mounting the guide rail 1 on, for example, a base is made in the guide rail 1.

The carriage 2 includes a carriage body 3, an inner plate 4 mounted on each end surface of the carriage body 3 in the direction of the relative movement, and the end plate 5 mounted on each end surface of the carriage body 3 in such a manner as to cover the inner plate 4.

As illustrated in FIG. 3, the carriage body 3 has an inverted U-shape in front view (FIG. 3 illustrates only the right half, but the carriage body 3 is left-right symmetric), and includes a center portion 3a facing an upper surface of the guide rail 1, and left and right sleeve portions 3b facing side surfaces of the guide rail 1. Two upper and lower loaded ball rolling portions 13 facing the ball rolling portions 12 of the guide rail 1 are formed on each of the left and right sleeve portions 3b of the carriage body 3. Two loaded ball rolling grooves 3c are formed on each loaded ball rolling portion 13. Eight loaded ball rolling grooves 3c in total are formed on the carriage body 3. The loaded ball rolling groove 3c is a circular arc groove with a single arc cross-section.

A loaded path C1 is formed between the loaded ball rolling portion 13 of the carriage body 3 and the ball rolling portion 12 of the guide rail 1. The angle formed by a direction of a contact angle L1 of the ball 6 of the upper loaded path C1 and a horizontal direction L2 is θ1. The angle formed by a direction of a contact angle L3 of the ball 6 of the lower loaded path C1 and the horizontal direction L2 is θ2. Here, the directions of the contact angles L1 and L3 are directions of lines linking a contact point between the ball 6 and the ball rolling groove 1a and a contact point between the ball 6 and the loaded ball rolling groove 3c. θ1 and θ2 are determined as appropriate depending on the direction of a load received by the carriage 2. When θ1 and θ2 are set at, for example, 45°, it becomes possible for the carriage 2 to uniformly receive loads in four directions, up, down, left, and right.

It is also possible to form the ball rolling groove 1a and the loaded ball rolling groove 3c into Gothic arch grooves. In a case of the Gothic arch groove, the direction of the contact angle is a direction of a line linking the bottom of the Gothic arch groove of the ball rolling groove 1a and the bottom of the Gothic arch groove of the loaded ball rolling groove 3c.

As illustrated in FIG. 3, a through-hole 14 is formed parallel to the loaded ball rolling portion 13 in the carriage body 3. A return path constituent member 15 forming a return path C2 is inserted into the through-hole 14. A total of four upper and lower return paths C2 are provided in the left and right sleeve portions 3b of the carriage body 3, two in each sleeve portion 3b. The return paths C2 are placed in positions shifted from the directions of the contact angles L1 and L3 of the balls 6 to the horizontal direction L2.

As illustrated in FIGS. 1 and 2, the inner plate 4 has an inverted U-shape in front view, and includes a center portion 4a facing the upper surface of the guide rail 1 and a pair of left and right sleeve portions 4b facing the side surfaces of the guide rail 1. Inner sides of substantially U-shaped turn paths C3 connecting the loaded paths C1 and the return paths C2 are formed on the sleeve portion 4b of the inner plate 4.

As illustrated in FIG. 1, the end plate 5 also has an inverted U-shape in front view, and includes a center portion 5a facing the upper surface of the guide rail 1 and a pair of left and right sleeve portions 5b facing the side surfaces of the guide rail 1. Outer sides of the substantially U-shaped turn paths C3 are formed on the sleeve portion 5b of the end plate 5. A total of four upper and lower turn paths C3 are provided on the left and right sleeve portions 4b and 5b of the inner plate 4 and the end plate 5, two on each pair of the sleeve portions 4b and 5b.

The end plate 5 and the inner plate 4 are mounted by a bolt 21 (refer to FIG. 2) on the carriage body 3. A through-hole for the bolt is formed in the end plate 5 and the inner plate 4. The bolt 21 is passed through the through-hole of the end plate 5 and the inner plate 4. The bolt 21 is screwed into the carriage body 3. Accordingly, the end plate 5 and the inner plate 4 are mounted on the carriage body 3.

Figure 4:
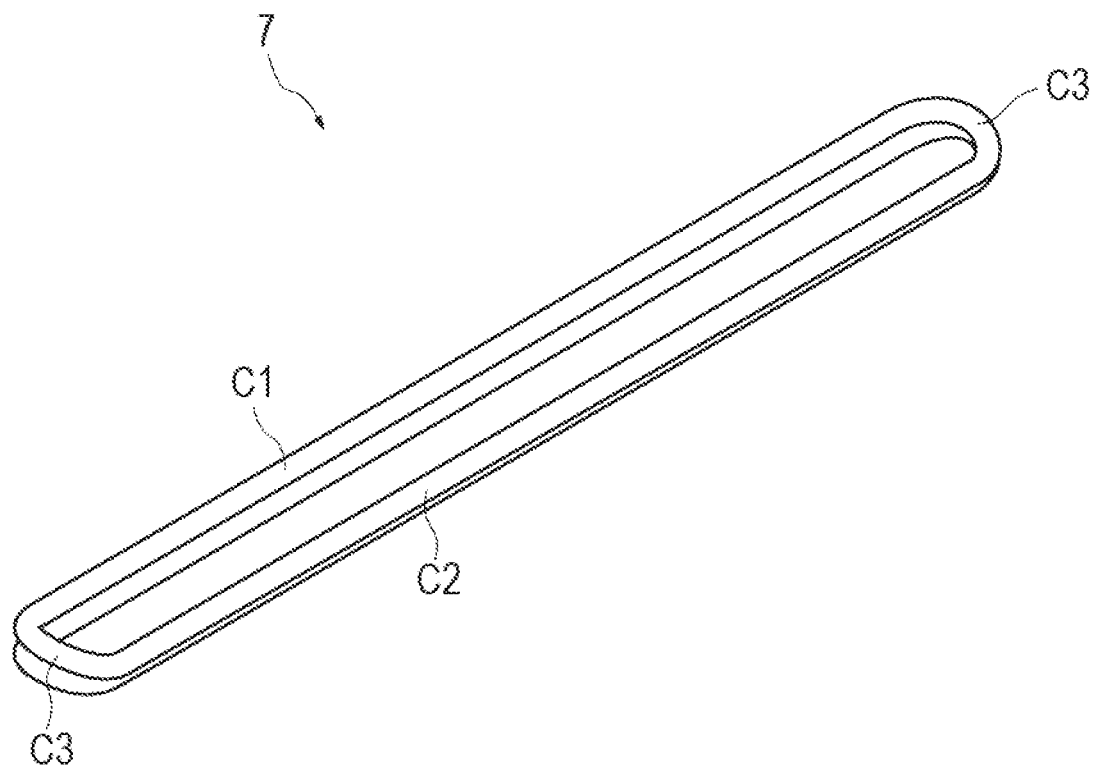
FIG. 4 is a perspective view of a circulation path.

FIG. 4 illustrates a perspective view of the circulation path 7. FIG. 5 illustrates third angle projection of the circulation path 7. The track-shaped circulation path 7 includes the linear loaded path C1, the linear return path C2, and a pair of the substantially U-shaped turn paths C3. A total of four upper and lower circulation paths 7 are provided in the left and right sleeve portions of the carriage 2, two in each sleeve portion (refer to FIG. 2).

Figure 5A:
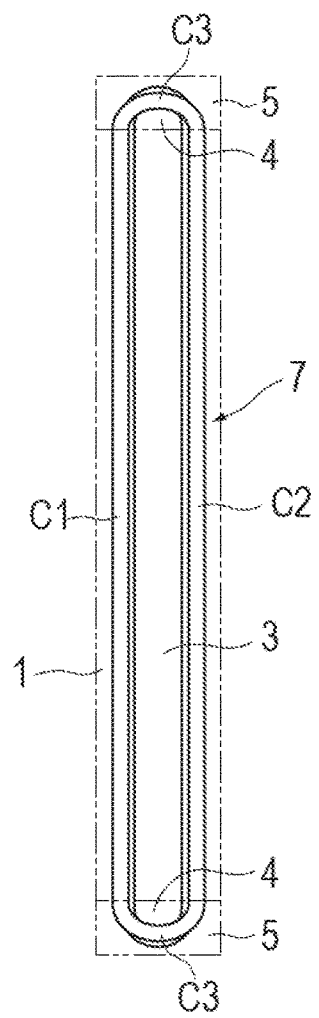
FIGS. 5A-5C are third angle projection (FIG. 5A is a plan view, FIG. 5B is a front view, and FIG. 5C is a side view) of the circulation path.

As illustrated in FIG. 5A, the loaded path C1 is formed between the guide rail 1 and the carriage body 3. The return path C2 is formed in the carriage body 3. The turn path C3 is formed between the inner plate 4 and the end plate 5. In the embodiment, the two ball rows 6a and 6b are arranged in the circulation path 7. Accordingly, the circulation path 7 has a shape formed by stacking two stages of upper and lower ball circulation paths with a substantially circular cross-section.

Figure 5B:
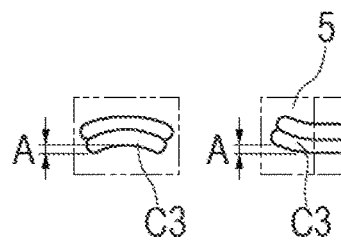
Figure 5C:
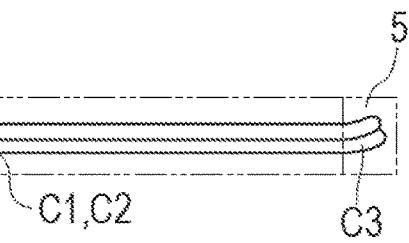

As illustrated in FIG. 5C, the turn path C3 bends in side view in the direction where the loaded path C1 and the return path C2 coincide. In side view, a deviation A indicating the degree of curvature occurs between the center of the turn path C3 (the center of the turn path C3 in the moving direction of the ball 6) and the loaded path C1 and the return path C2. As a result, the turn path C3 bends into a convex shape in front view as illustrated in FIG. 5B. The side view in the direction where the loaded path C1 and the return path C2 coincide indicates viewing the upper loaded path C1 and return path C2 of FIG. 3 in an upper right diagonal direction (a direction of an arrow V1) and viewing the lower loaded path C1 and return path C2 of FIG. 3 in a lower right diagonal direction (a direction of an arrow V2).

As illustrated in FIG. 2, the upper turn path C3 bends upward into a convex shape, and the lower turn path C3 bends downward into a convex shape. The upper turn path C3 and the lower turn path C3 are furthest apart at center portions thereof in the left and right direction (a width direction). The mounting bolt 21 of the end plate 5 is placed between the center portion of the upper turn path C3 in the width direction and the center portion of the lower turn path C3 in the width direction.

Figure 6A:
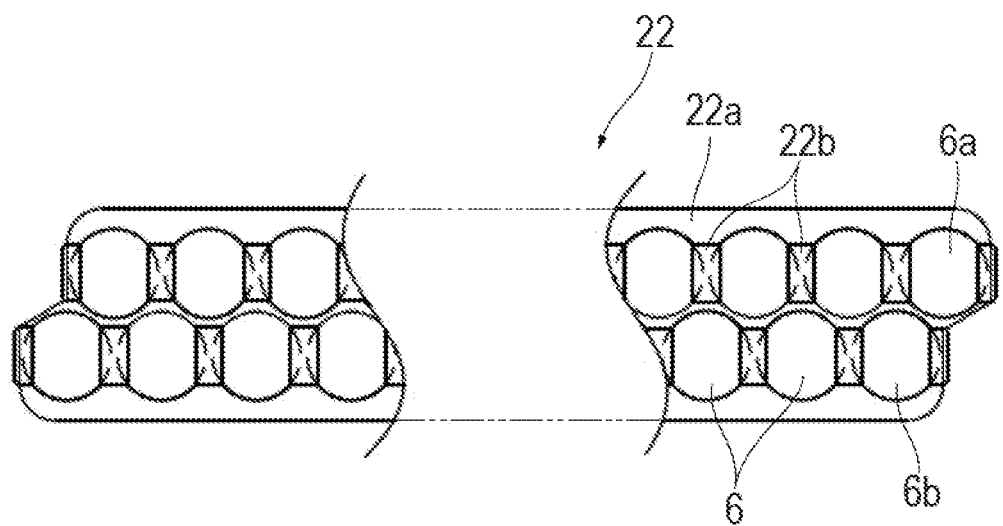
FIGS. 6A and 6B are diagrams (FIG. 6A is a plan view and FIG. 6B is a side view) illustrating a retainer band.
Figure 6B:
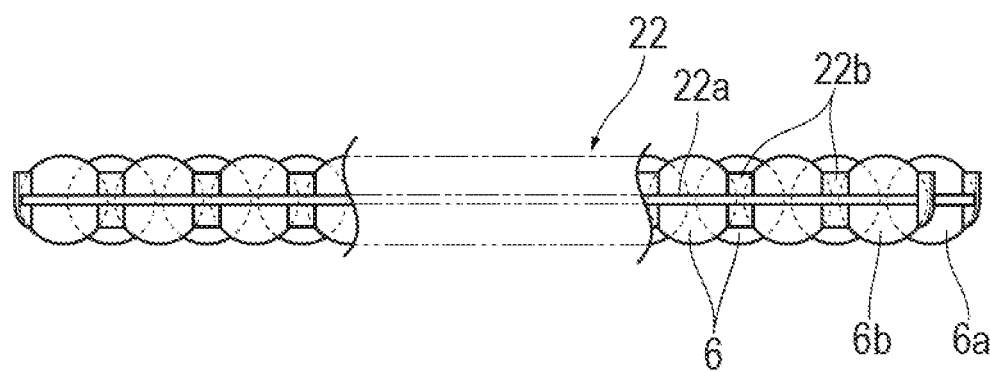

As illustrated in FIG. 6, a retainer band 22 includes a single flat band-shaped band body 22a, and a plurality of spacers 22b that are disposed between the balls 6 and formed integrally with the band body 22a. In the embodiment, the two ball rows 6a and 6b are held by the retainer band 22. One ball row 6a and the other ball row 6b are displaced by a half pitch phase.

As illustrated in FIG. 2, the carriage body 3 is provided with holding portions 23a, 23b, and 23c that hold and guide the retainer bands 22 in the loaded paths C1. The reference sign 5 in FIG. 2 denotes the endplate on the rear side. As illustrated in FIG. 3, the return path constituent member 15 of the carriage body 3 is provided with a guide groove 15a that guides the retainer band 22 in the return path C2. A guide groove that guides the retainer band 22 in the turn path C3 is provided between the inner plate 4 and the end plate 5.

As illustrated in FIG. 3, the retainer band 22 in the loaded path C1 and the retainer band 22 in the return path C2 are spaced apart in an inverted V-shape in cross-section of the carriage 2. This is because the retainer bands 22 are placed perpendicularly to directions of the contact angles L1 and L3 to ensure the contact width of the balls 6 in the loaded paths C1 and the return paths C2 are placed in the positions shifted from the directions of the contact angles L1 and L3 to the horizontal direction L2 to make the carriage 2 compact.

Figure 7:
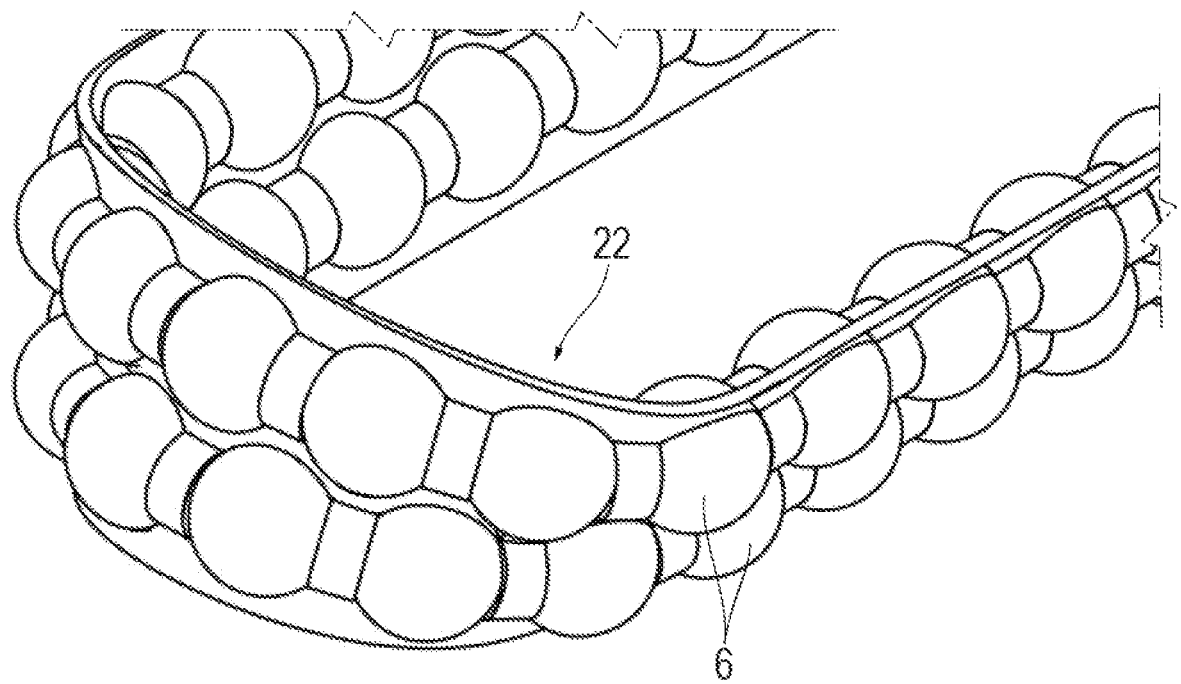
FIG. 7 is a perspective view of the retainer band spaced apart in an inverted V-shape.

FIG. 7 illustrates a perspective view of the retainer band 22 spaced apart in an inverted V-shape. FIG. 8 illustrates third angle projection of the retainer band 22 spaced apart in an inverted V-shape. When the band-shaped retainer band 22 is bent into a substantially U-shape and spread apart in an inverted V-shape as illustrated in FIG. 7, a turn portion 22c of the retainer band 22 bends automatically toward a spreading direction P as illustrated in the side view of FIG. 8C. This state is a natural state having minimum stress generated. The deviation A indicating the degree of curvature occurs between the center of the turn portion 22c of the retainer band 22 (the center of the turn portion 22c of the retainer band 22 in a length direction) and a linear portion 22d of the retainer band 22 spaced apart in an inverted V-shape. As illustrated in FIG. 5C, the turn path C3 also bends toward the direction spread apart in an inverted V-shape to be adjusted to the bend of the retainer band 22. The deviation A of the turn path C3 agrees with the deviation A of the turn portion 22c of the retainer band 22.

The motion guide apparatus of the embodiment has the following effects: the turn path C3 bends in side view where the loaded path C1 and the return path C2 coincide (refer to FIG. 5C). Accordingly, the return paths C2 can be placed in the positions shifted from the directions of the contact angles L1 and L3 of the balls 6 to the horizontal direction L2 without sacrificing the contact width between the ball 6 and the ball rolling groove 1a and the contact width between the ball 6 and the loaded ball rolling groove 3c (refer to FIG. 3). Hence, it is possible to prevent reductions in rated load and allowable load and make the carriage 2 compact. Moreover, the rated load and the allowable load can be increased in a motion guide apparatus of the same size.

The retainer band 22 is spread apart in an inverted V-shape, and the turn path C3 is bent toward the direction P where the retainer band 22 is spread apart in an inverted V-shaped in side view (refer to FIGS. 5C and 8C). Accordingly, the bend of the turn path C3 can be adjusted to the bend of the retainer band 22, and the retainer band 22 can be naturally turned.

The retainer band 22 holds two or more ball rows 6a and 6b. Accordingly, it is possible to stabilize the attitude of the retainer band 22 spaced apart in an inverted V-shape in the loaded path C1 and the return path C2 (refer to FIG. 3), and prevent or reduce the scrape of the retainer band 22 in the guide groove.

In front view, the upper turn path C3 bends upward into a convex shape, and the lower turn path C3 bends downward into a convex shape (refer to FIG. 2). Accordingly, the motion guide apparatus can be made more compact.

The upper turn path C3 and the lower turn path C3 are furthest apart at the center portions in the left and right direction (the width direction) (refer to FIG. 2). Accordingly, the mounting bolt 21 of the end plate 5 can be placed between the center portions, and the size of the bolt 21 can be increased. The end plate 5 generally uses a substantially plate-shaped one made of resin in terms of productivity and functionality. The end plate 5 is fixed to the metal carriage body 3 with a finite number of the bolts 21. Accordingly, a portion, which is away from the position of the bolt 21, of the end plate 5 may have poor adhesion to the carriage body 3. A known mounting bolt 21' of the end plate 5 needs to be placed in an unbalanced position with respect to the turn path C3. However, the placement of the bolt 21 at the center portions of the turn paths C3 in the left and right direction allows improving adhesion between the end plate 5 and the carriage body 3.

Second Embodiment

Figure 9:
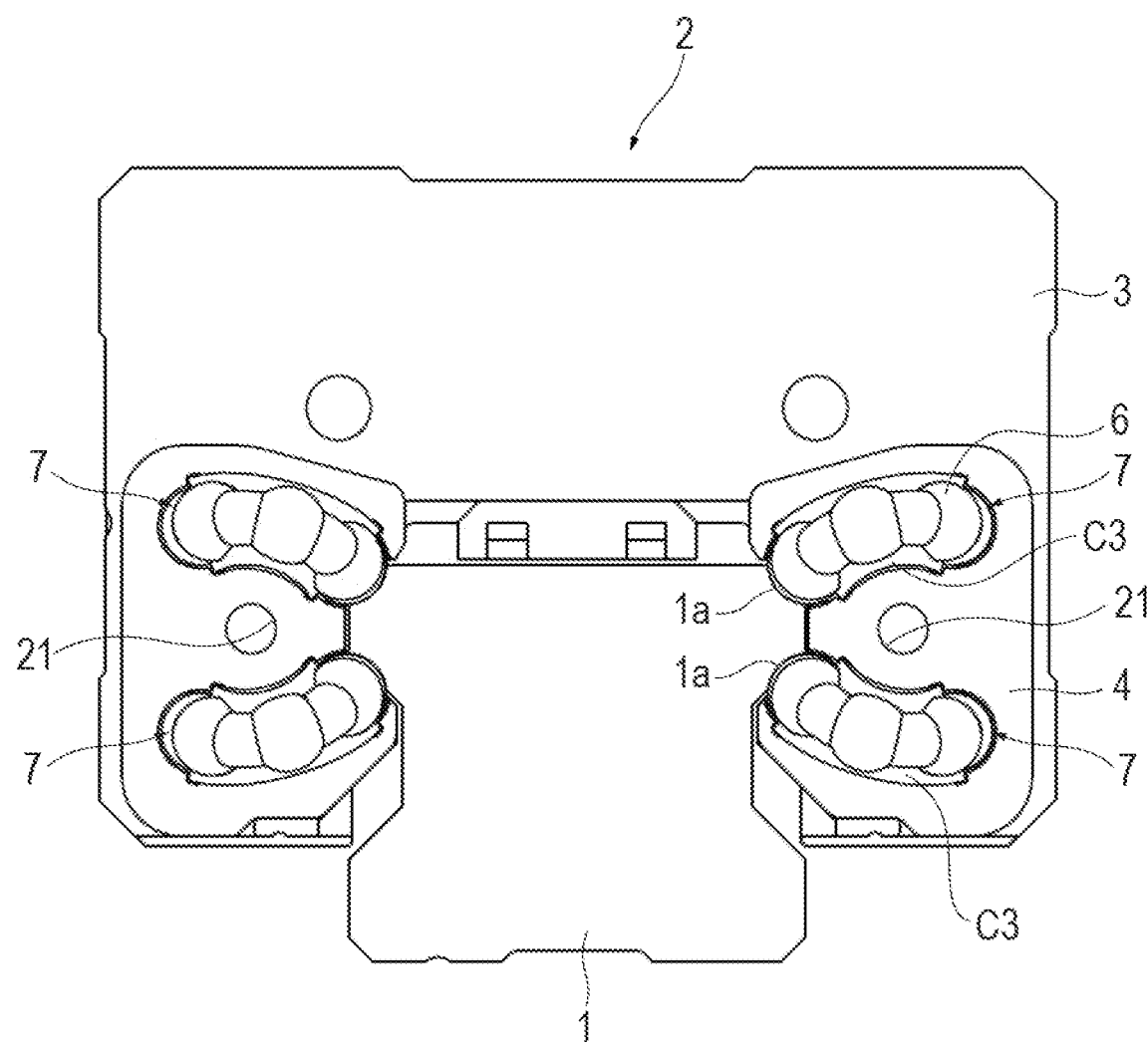
FIG. 9 is a front view of a motion guide apparatus of a second embodiment of the present invention in a state where an end plate has been removed.

FIG. 9 illustrates a motion guide apparatus of a second embodiment of the present invention. FIG. 9 illustrates a front view of the motion guide apparatus in a state where an end plate 5 has been removed.

The motion guide apparatus of the second embodiment also includes a guide rail 1 as a track member, a carriage 2 assembled to the guide rail 1 in such a manner as to be relatively movable, and balls 6 as rolling elements disposed between the guide rail 1 and the carriage 2. Two upper and lower track-shaped circulation paths 7 are provided on each of the left and right sides of the carriage 2.

In the second embodiment, a point that one ball row is arranged in the circulation path 7 is different from the first embodiment. One ball rolling groove 1a is formed on each ball rolling portion of the guide rail 1. Four ball rolling grooves 1a in total are formed on the guide rail 1. One loaded ball rolling groove is formed on each loaded ball rolling portion of a carriage body 3. Four loaded ball rolling grooves in total are formed on the carriage body 3. The other configurations of the guide rail 1, the carriage body 3, and the inner plate 4 are substantially the same as those of the first embodiment. Accordingly, the same reference signs are assigned to the other configurations, and their descriptions are omitted.

Figure 10A:
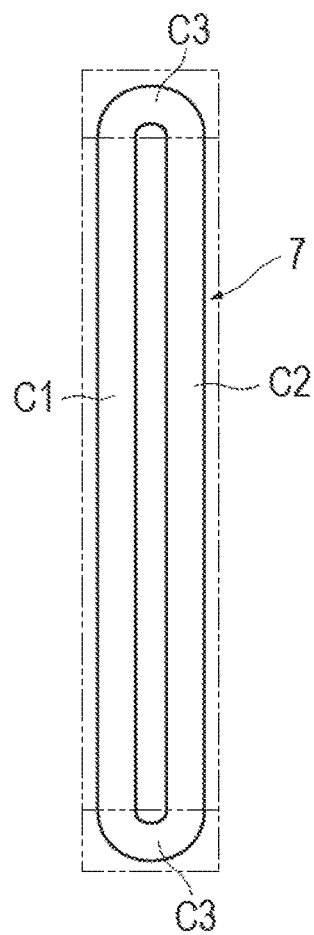
FIGS. 10A-10C are third angle projection (FIG. 10A is a plan view, FIG. 10B is a front view, and FIG. 10C is a side view) of a circulation path.
Figure 10B:
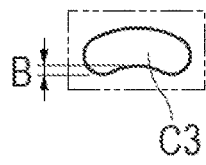
Figure 10C:
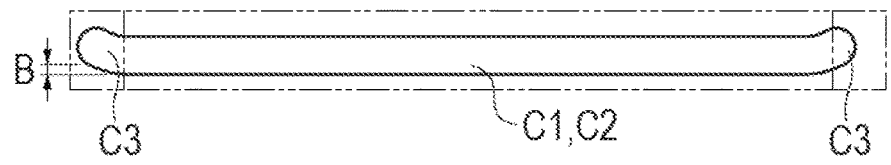

FIG. 10 illustrates third angle projection of the circulation path 7. The track-shaped circulation path 7 includes the linear loaded path C1, the linear return path C2, and the pair of substantially U-shaped turn paths C3. As illustrated in FIG. 10C, the turn path C3 bends in side view in a direction where the loaded path C1 and the return path C2 coincide. In side view, a deviation B indicating the degree of curvature occurs between the center of the turn path C3 (the center of the turn path C3 in the moving direction of the ball 6) and the loaded path C1 and the return path C2. As a result, the turn path C3 bends into a convex shape in front view as illustrated in FIG. 10B.

As illustrated in FIG. 9, the upper turn path C3 bends upward into a convex shape, and the lower turn path C3 bends downward into a convex shape. The upper turn path C3 and the lower turn path C3 are furthest apart at center portions thereof in the left and right direction (the width direction). The mounting bolt 21 of the end plate 5 is placed between the center portion of the upper turn path C3 in the width direction and the center portion of the lower turn path C3 in the width direction.

Figure 11A:
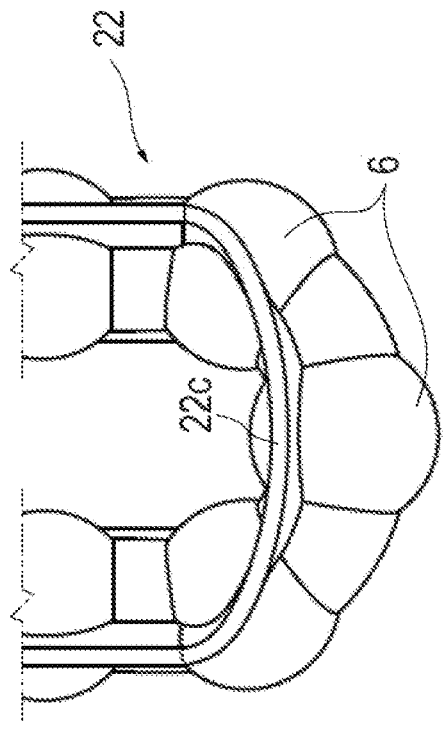
FIGS. 11A-11C are third angle projection (FIG. 11A is a plan view, FIG. 11B is a front view, and FIG. 11C is a side view) of a retainer band spaced apart in an inverted V-shape.
Figure 11B:
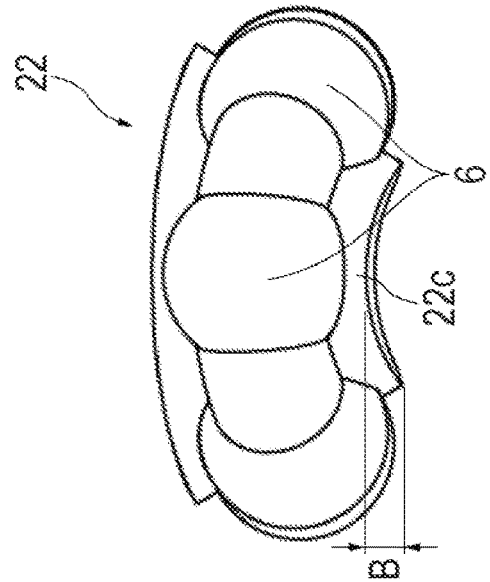
Figure 11C:
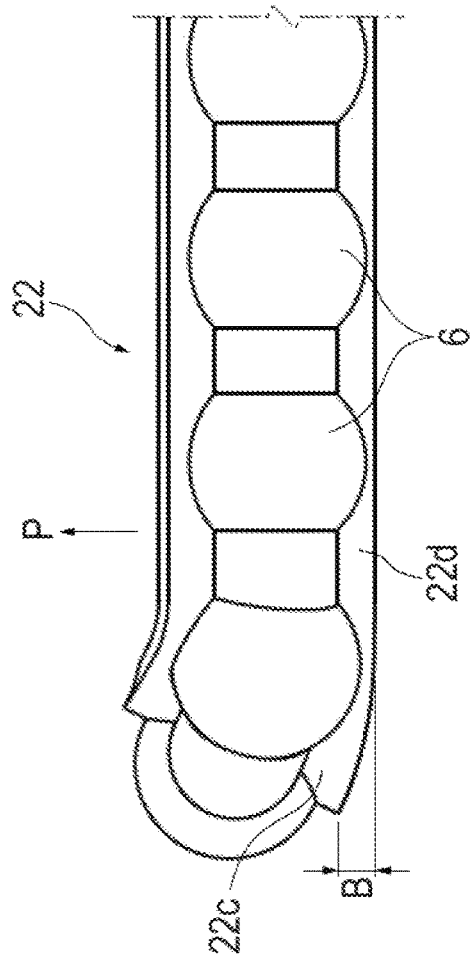

FIG. 11 illustrates third angle projection of a retainer band spaced apart in an inverted V-shape. When the band-shaped retainer band 22 is bent into a substantially U-shape and spread apart in an inverted V-shape as illustrated in FIG. 11, the turn portion 22c of the retainer band 22 bends automatically toward the spreading direction P as illustrated in the side view of FIG. 11C. The deviation B indicating the degree of curvature occurs between the center of the turn portion 22c of the retainer band 22 (the center of the turn portion 22c of the retainer band 22 in the length direction) and the linear portion 22d spaced apart in an inverted V-shape. As illustrated in FIG. 10C, the turn path C3 also bends toward the direction spread apart in an inverted V-shape to be adjusted to the bend of the retainer band 22. The deviation B of the turn path C3 agrees with the deviation B of the turn portion 22c of the retainer band 22.

Also in the second embodiment, the turn path C3 bends in side view where the loaded path C1 and the return path C2 coincide (refer to FIG. 10C). Accordingly, the return paths C2 can be placed in the positions shifted from the directions of the contact angles of the balls 6 to the horizontal direction without sacrificing the contact width between the ball 6 and the ball rolling groove 1a and the contact width between the ball 6 and the loaded ball rolling groove (refer to FIG. 9). Hence, it is possible to prevent reductions in rated load and allowable load of the motion guide apparatus and make the carriage 2 compact.

The retainer band 22 is spread apart in an inverted V-shape, and the turn path C3 is bent toward the direction where the retainer band 22 is spread apart in an inverted V-shaped in side view (refer to FIGS. 10C and 11C). Accordingly, the bend of the turn path C3 can be adjusted to the bend of the retainer band 22, and the retainer band 22 can be naturally turned.

The present invention is not limited to the above embodiments, and can be modified in various manners within the scope that does not change the gist of the present invention.

In the first and second embodiments of the motion guide apparatus, the retainer band that holds the balls can be omitted. In other words, the present invention can also be applied to a full ball-type motion guide apparatus.

In the first and second embodiments of the motion guide apparatus, the entire turn path bends in side view. However, it is also possible to bend only a part of the turn path.

A roller can also be used as the rolling element, instead of the balls. The present invention can also be applied to a ball spline in addition to the linear guide.

The invention claimed is:

1. A motion guide apparatus comprising:
a track member including a rolling element rolling portion;
a carriage including a loaded rolling element rolling portion facing the rolling element rolling portion, a return path parallel to the loaded rolling element rolling portion, and a substantially U-shaped turn path connected to the loaded rolling element rolling portion and the return path; and
a plurality of rolling elements arranged in a loaded path between the rolling element rolling portion and the loaded rolling element rolling portion, the return path, and the turn path in such a manner as to be capable of circulating, wherein
the rolling elements are held by a retainer band,
the retainer band includes a single flat band-shaped band body, and a plurality of spacers that are disposed between the rolling elements and formed integrally with the band body,
as viewed from a front of the carriage in a state where the motion guide apparatus is placed on a horizontal plane, the loaded path, the return path and the turn path are provided on upper and lower sides in each of left and right sides of the carriage for a total of four, respectively,
the respective loaded path is connected to the respective turn path,
the respective return path is connected to the respective turn path,
the retainer band in the lower loaded path and the retainer band in the lower return path are spaced apart in an inverted V-shape, and the retainer band in the upper loaded path and the retainer band in the upper return path are spaced apart in a V-shape, in a cross-sectional view orthogonal to a direction of relative movement of the carriage, and
at least a part of the lower turn path and a part of the retainer band bend toward a direction where the retainer band is spread apart in the inverted V-shape in a side view in a direction where the lower loaded path and the lower return path coincide,
at least a part of the upper turn path and a part of the retainer band bend toward a direction where the retainer band is spread apart in the V-shape in a side view in a direction where the upper loaded path and the upper return path coincide, and
the upper turn path bends upward into a convex shape and the lower turn path bends downward into a convex shape as viewed from the front of the carriage in the state where the motion guide apparatus is placed on the horizontal plane.

2. The motion guide apparatus according to claim 1, wherein two or more rows of the rolling elements are held by the retainer band.

3. The motion guide apparatus according to claim 2, wherein
the upper turn path and the lower turn path are furthest apart at center portions thereof in a width direction, and
a mounting bolt of an end plate where outer sides of the turn paths are formed is placed between the upper turn path and the lower turn path.

4. The motion guide apparatus according to claim 1, wherein
the upper turn path and the lower turn path are furthest apart at center portions thereof in a width direction, and
a mounting bolt of an end plate where outer sides of the turn paths are formed is placed between the upper turn path and the lower turn path.

* * * * *